United States Patent [19]
Rylands

[11] 3,710,504
[45] Jan. 16, 1973

[54] PLAYTHING
[75] Inventor: Patrick Rylands, London, England
[73] Assignee: Rosedale Industries Limited, London, England
[22] Filed: Jan. 26, 1972
[21] Appl. No.: 220,821

[30] Foreign Application Priority Data
Feb. 1, 1971 Great Britain..................3629/71

[52] U.S. Cl..................46/1 R, 46/174, 46/191, 46/193
[51] Int. Cl................................A63h 33/00
[58] Field of Search........46/174, 175, 179, 191, 193, 46/1; 272/1

[56] References Cited
UNITED STATES PATENTS
465,066  12/1891  Murphy..................46/191
1,924,957  8/1933  Orr..................46/174

Primary Examiner—Louis G. Mancene
Assistant Examiner—D. L. Weinhold
Attorney—Peter H. Smolka

[57] ABSTRACT

The specification discloses a plaything which comprises a pair of open-ended receptacles with the blind ends thereof connected together so as to provide a passageway which communicates the interiors of the two receptacles, a pair of members which will fit into said receptacles, and an element connecting said members together and extending through said passageway, said connecting element being longer than the passageway so that only one of the members at a time can be fully contained in its associated receptacle.

4 Claims, 3 Drawing Figures

PATENTED JAN 16 1973

3,710,504

3,710,504

PLAYTHING

BACKGROUND OF THE INVENTION

This invention relates to playthings and has for its object the provision of a plaything which is especially attractive to a baby or young child.

SUMMARY AND DESCRIPTION OF INVENTION

According to this invention there is provided a plaything which comprises a pair of open-ended receptacles with the blind ends thereof connected together so as to provide a passageway which communicates the interiors of the two receptacles, a pair of members which will fit into said receptacles, and an element connecting said members together and extending through said passageway, said connecting element being longer than the passageway so that only one of the members at a time can be fully contained in its associated receptacle.

A plaything in accordance with one embodiment of this invention will now be described in some detail, with reference to the accompanying drawings.

DESCRIPTION OF SHOWN EMBODIMENTS

Figure 1:
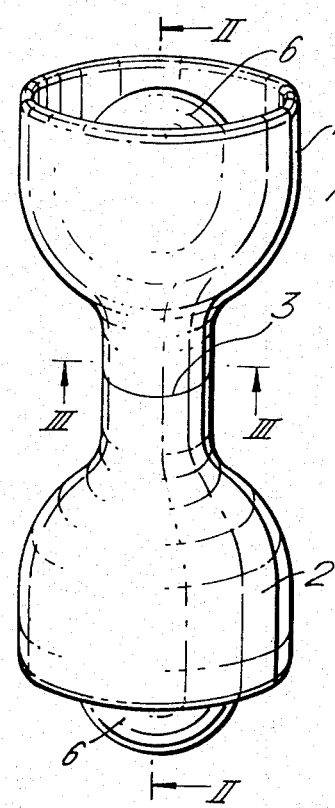
FIG. 1 is a general perspective view of the plaything.
Figure 2:
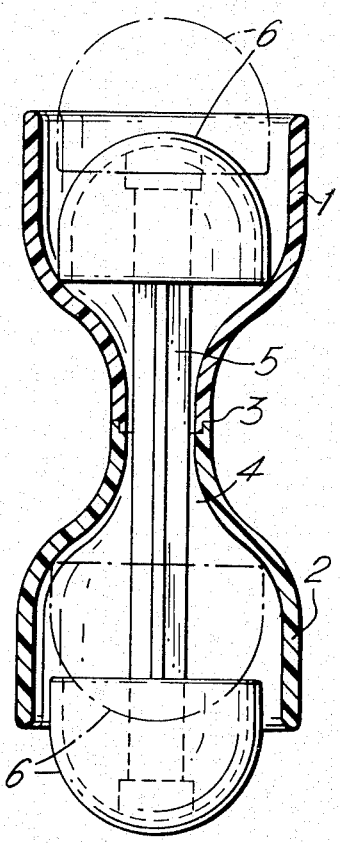
FIG. 2 is a section on the line II—II in FIG. 1.
Figure 3:
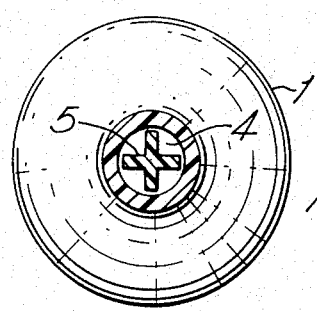
FIG. 3 is a section on the line III—III in FIG. 1.

The plaything shown in the drawings consists of two receptacles 1 and 2 which may conveniently be likened to stemmed egg cups with the base of each stem broken off. The free ends of the two stem portions are joined together at 3 and provide in them a passageway 4 which communicates the interiors of the two cups. Thus the two cups with their joined stems form together a member of dumb-bell shape.

Extending freely through the passageway is a rod 5, the latter being slightly longer than the former, and connected to the opposite ends of this rod are two substantially semi-spherical members 6 which will fit easily into the cups. However, as the rod 5 is longer than the passageway 4, when one member 6 is contained fully in its associated cup, then the other member 6 projects from the cup associated therewith. By shaking the plaything as a whole, or turning it upside down, the positions of the two members 6 in relation to their respective receptacles 1 and 2 can be reversed.

I claim:

1. A plaything which comprises a pair of open-ended receptacles with the blind ends thereof connected together so as to provide a passageway which communicates the interiors of the two receptacles, a pair of members which will fit into said receptacles, and an element connecting said members together and extending through said passageway, said connecting element being longer than the passageway so that only one of the members at a time can be fully contained in its associated receptacle.

2. A plaything as claimed in claim 1 wherein the receptacles are like stemmed egg cups with the base of each stem broken off and the free ends of the two stem portions joined together to provide in them the said passageway.

3. A plaything as claimed in claim 2 wherein the connecting element comprises a rod which is longer than the passageway and to the opposite ends of which the two members are connected.

4. A plaything as claimed in claim 3 wherein said members are of part-spherical shape.

* * * * *